US006220778B1

(12) United States Patent
Suchanek et al.

(10) Patent No.: US 6,220,778 B1
(45) **Date of Patent: *Apr. 24, 2001**

(54) APPARATUS FOR RETAINING AND ALIGNING AN ELECTRICAL SWITCH HOUSING IN A CAST HOUSING MEMBER

(75) Inventors: Jürgen Suchanek, Auburn Hills; Larry W. Burr, Saginaw, both of MI (US)

(73) Assignee: Valeo Inc., Auburn, MI (US); a part interest ( * ) Notice: Subject to any disclaimer, the term of this patent is extended or adjusted under 35 U.S.C. 154(b) by 0 days.

This patent is subject to a terminal disclaimer.

(21) Appl. No.: 09/391,916

(22) Filed: Sep. 9, 1999

Related U.S. Application Data

(63) Continuation of application No. 08/728,691, filed on Oct. 10, 1996, now Pat. No. 6,069,332, which is a continuation-in-part of application No. 08/415,656, filed on Apr. 3, 1995, now Pat. No. 5,596,180.

(51) Int. Cl.[7] .................................................. F16B 21/00

(52) U.S. Cl. ............................ 403/327; 403/375; 24/613

(58) Field of Search .................................... 403/328, 324, 403/326, 375, 379.5, 109.3, 381, 109.5, 109.6, 104, 379.4; 200/293, 298; 24/612, 613, 615, 616, 604

(56) References Cited

U.S. PATENT DOCUMENTS

| | | | |
|---|---|---|---|
| 2,116,584 * | 5/1938 | Shelby | 403/381 |
| 2,187,372 * | 1/1940 | Capaldo | 403/109.3 X |
| 3,097,269 | 7/1963 | Campbell . | |
| 3,271,531 | 9/1966 | Winogrocki et al. | 200/11 C |
| 3,293,399 | 12/1966 | Heinrich . | |
| 3,319,016 | 5/1967 | Hoy et al. . | |
| 3,339,032 | 8/1967 | Hults . | |
| 3,500,389 | 3/1970 | Robinson | 200/11 TW X |
| 3,719,788 | 3/1973 | Holland et al. | 200/6 BB |
| 3,801,210 * | 4/1974 | Heinold et al. | 403/379.4 |
| 3,903,383 | 9/1975 | Marker | 200/11 TW |
| 3,941,447 * | 3/1976 | Hargrave et al. | 339/91 |
| 3,971,904 | 7/1976 | Ward | 200/6 BB |

FOREIGN PATENT DOCUMENTS

| | | |
|---|---|---|
| 1904616 | 8/1970 | (DE) . |
| 2533802 | 7/1975 | (DE) . |
| 3219579 | 12/1982 | (DE) . |
| 3237055 | 4/1983 | (DE) . |
| 4233520 | 6/1994 | (DE) . |
| 87944 | 10/1959 | (DK) . |
| 610395 | 10/1960 | (IT) . |

OTHER PUBLICATIONS

Schalter Dreh (Rotary Switch), 0724, G–501 420 D, Dated Sep. 15, 1988.
Stueck Schalt Switch Block 4270, Dated Sep. 15, 1988.
Schalter Schalt Switch Block 0724, D501 420–E, Dated Sep. 15, 1988.

*Primary Examiner*—Harry C. Kim
(74) *Attorney, Agent, or Firm*—J. Gordon Lewis

(57) ABSTRACT

An apparatus retains and aligns an electrical ignition switch of a motor vehicle with respect to a steering column housing. A switch housing supports the electrical switch and has at least one first aperture formed therein. The steering column housing slidably receives the switch housing therein, and the steering column housing has at least one second aperture formed therein. At least one locking member is engagable within the first aperture and is moveable between a first position retracted within the aperture and a second position extended outwardly with respect to the first aperture. The locking member engages within the second aperture when the switch housing is slidably engaged and fully seated within the steering column housing and holds the switch housing with respect to the steering column housing when engaged within the second aperture. A biasing member urges the locking member toward the second position.

5 Claims, 3 Drawing Sheets

U.S. PATENT DOCUMENTS

| | | | | |
|---|---|---|---|---|
| 4,042,795 | | 8/1977 | Sykorg . | |
| 4,074,548 | * | 2/1978 | Milton | 70/1.5 |
| 4,204,098 | | 5/1980 | Strande | 200/6 R |
| 4,563,551 | | 1/1986 | Black III et al. . | |
| 4,616,112 | | 10/1986 | Galloway et al. . | |
| 4,652,012 | * | 3/1987 | Biller et al. | 280/808 |
| 4,671,697 | * | 6/1987 | Ando et al. | 403/327 X |
| 4,751,352 | | 6/1988 | Botz et al. . | |
| 4,766,272 | | 8/1988 | Guzzon . | |
| 4,868,352 | | 9/1989 | Botz et al. | 200/4 |
| 4,901,475 | * | 2/1990 | Simpson | 49/175 |
| 5,070,620 | * | 12/1991 | Crain et al. | 403/109.3 X |
| 5,075,936 | * | 12/1991 | Glaser | 24/613 |
| 5,083,331 | * | 1/1992 | Schnelle et al. | 403/327 X |
| 5,182,422 | | 1/1993 | Botz et al. . | |
| 5,182,423 | | 1/1993 | Botz et al. . | |
| 5,196,662 | | 3/1993 | Hofman . | |
| 5,237,133 | | 8/1993 | Frank | 200/11 C |
| 5,374,777 | | 12/1994 | Hofmann . | |
| 5,584,366 | * | 12/1996 | Durand et al. | 200/295 X |
| 5,593,196 | * | 1/1997 | Baum et al. | 403/109.3 X |
| 5,596,180 | * | 1/1997 | Hofmann et al. | 200/6 B |
| 5,611,638 | * | 3/1997 | Dorr et al. | 403/327 |
| 5,636,730 | * | 6/1997 | Merten et al. | 200/293 |
| 5,879,101 | * | 3/1999 | Hagura | 403/326 |
| 6,069,332 | * | 5/2000 | Suchanek et al. | 200/293 |

* cited by examiner

APPARATUS FOR RETAINING AND ALIGNING AN ELECTRICAL SWITCH HOUSING IN A CAST HOUSING MEMBER

RELATED APPLICATIONS

This application is a continuation application of U.S. patent application Ser. No. 08/728,691 filed Oct. 10, 1996, U.S. Pat. No. 6,069,332, which is a continuation-in-part application of U.S. patent application Ser. No. 08/415,656 filed on Apr. 3, 1995, U. S. Pat. No. 5,596,180 for an Ignition Switch with Electrically Conductive Leaf Spring Members.

FIELD OF THE INVENTION

The present invention relates to a mechanism for aligning and retaining a first member or housing that is slidably receivable within an aperture formed in a second member or housing, and more particularly, to a device for retaining and aligning an electrical ignition switch of a motor vehicle with a respect to a steering column housing or casting.

BACKGROUND OF THE INVENTION

It has been known in the past to attached first and second members, such as an electrical switch housing and steering column housing, with respect to one another using various types of threaded fasteners. While this type of attachment has provided adequate connection of the first and second members with respect to one another, it has not provided the desired ease of installation. In addition, this type of connection has not provided adequate, automatic compensation for differences in the tolerance of various assembled parts and proper alignment and interaction of those parts after installation of the switch housing with respect to the steering column housing.

SUMMARY OF THE INVENTION

The present invention seeks to address all of the deficiencies of the prior known fasteners for connecting a first member with a respect to a second member, and more particularly, to an electrical switch housing with respect to a steering column housing. An apparatus according to the present invention holds a first member with a respect to a second member, and more particularly retains and aligns an electrical ignition switch of a motor vehicle with a respect to a steering column housing. The apparatus can include a switch housing means having a first wall for supporting the electrical switch and at least one first aperture. The steering column housing is adapted for slidably receiving the switch housing means therein. The steering column housing has a second wall and at least one second aperture. Plunger means is engagable within the first aperture and moveable between a first position retracted within the first aperture and a second position extended outwardly with respect to the first aperture. The plunger means engages within the second aperture when the switch housing means is slidably engaged and fully seated within the steering column housing. The plunger means holds the switch housing means with respect to the steering column housing. Biasing means is provided for urging the plunger means toward the second position.

The present invention can also include guide means for guiding the switch housing means with respect to the steering column housing during insertion therein. The guide means can include the switch housing means having at least one guide rail disposed thereon, and the steering column housing having at least one complementary guide slot form therein for receiving the guide rail of the switch housing means during insertion of the switch housing means within the steering column housing. In the preferred embodiment, the first aperture is formed in the guide rail of the switch housing means for receiving the plunger means therein, and the second aperture is formed in a side wall defining the guide rail slot in the steering column housing.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
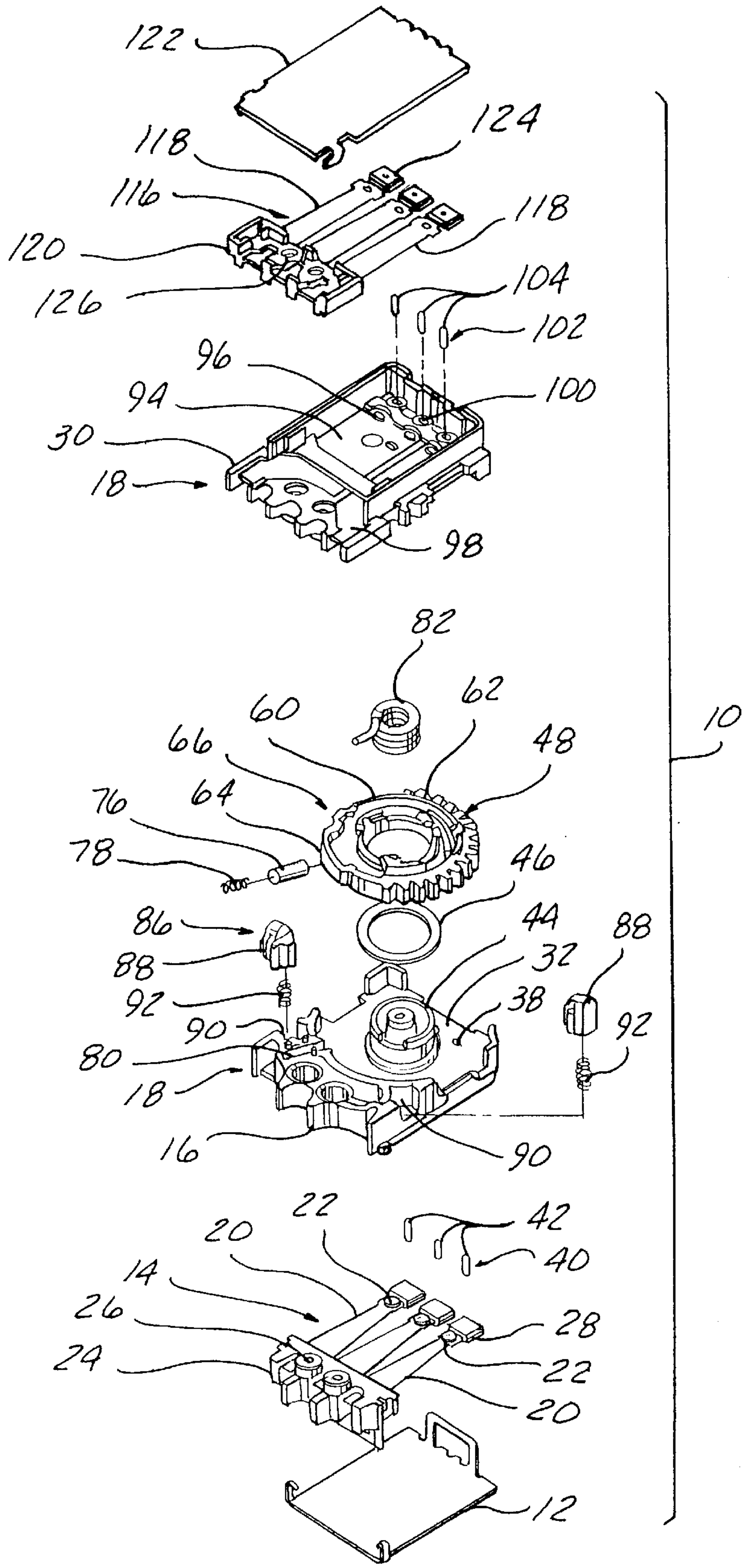
FIG. 1 is an exploded perspective view of an electrical ignition switch according to the present invention.
Figure 2:
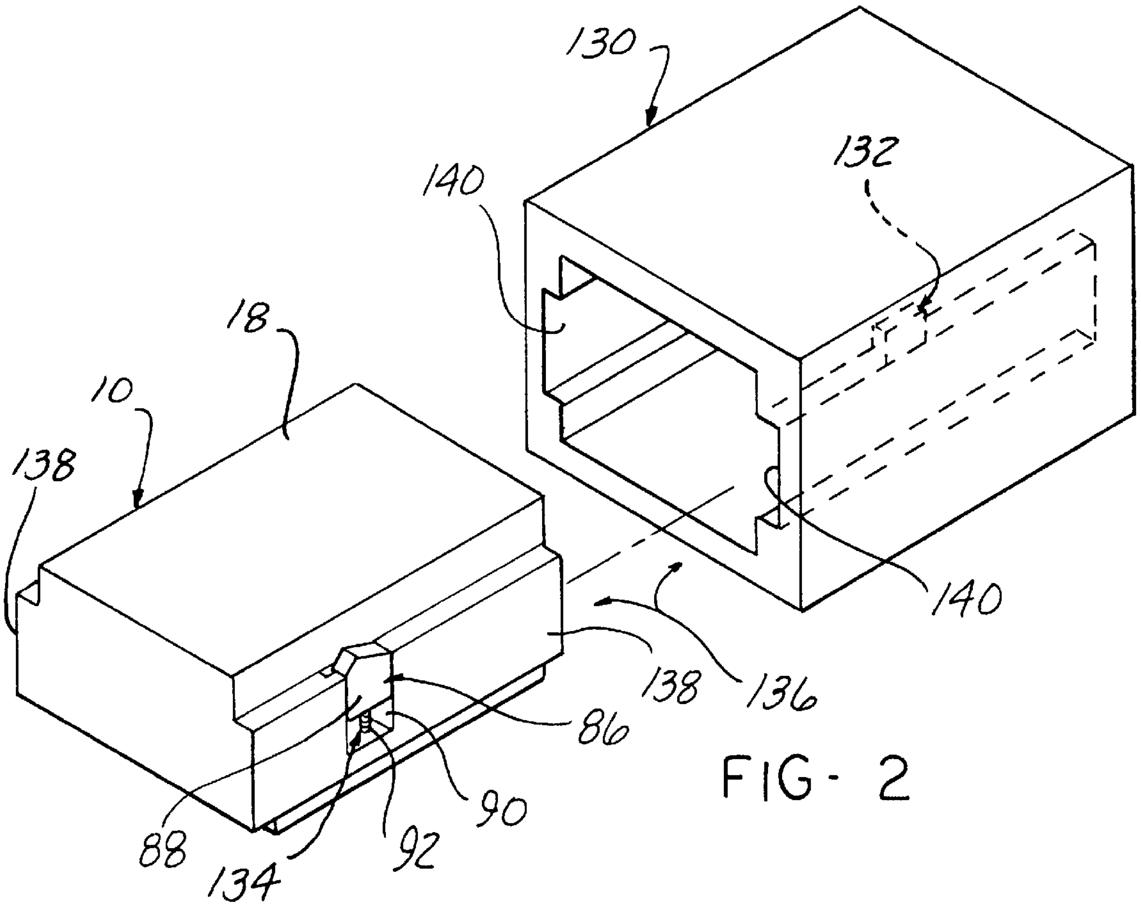
FIG. 2 is a simplified, exploded perspective view of a steering column housing or casting for slidably receiving an assembled electrical ignition switch housing according to the present invention.

The present invention relates to a first member, such as an electrical ignition switch generally designated as numeral 10, particularly for use as an ignition switch in vehicles for controlling the starter, ignition and accessory functions. Referring now to FIG. 1, the electrical switch 10 according to the present invention includes a first cover 12, or lower cover as illustrated in FIG. 1, to substantially enclose a first electrically conductive leaf spring means 14 with respect to a first part 16 of housing means 18. Preferably, the leaf spring means 14 is constructed of electrically conductive, resiliently flexible material. A metallic material such as beryllium copper (BeCu) has been found suitable for switching 35 amps of continuous power up to peaks of approximately 50 amps, as well as low amperage applications down to the milli-amp range. The first leaf spring means 14 can include at least one electrically conductive leaf spring member 20, and preferably a plurality of electrically conductive leaf spring members 20 independently operable and flexible with respect to one another, such as the three leaf spring members 20 illustrated as part of the first leaf spring means 14 in FIG. 1. Each leaf spring member 20 includes an electrical contact 22 adjacent one end of the elongate leaf spring member 20. The opposite end of the elongate leaf spring member 20 is fixedly secured in place, so that the cantilevered electrical contact 22 on each leaf spring member 20 can be flexed outwardly toward the first cover 12 while simultaneously resiliently biased by the resiliency of the leaf spring member 20 toward an original position of the leaf spring member 20. Preferably, the first leaf spring means 14 is formed by injection molding plastic portions with respect to the electrically conductive leaf spring member 20. A common support 24 is preferably molded at the one anchored end of each leaf spring member 20 for holding the one end of each leaf spring member 20 fixedly secured in a relative position with respect to one another and including apertures 26 for attachment to the housing means 18. In addition, each leaf spring member 20 has at an opposite free cantilevered end an injection molded plastic pad 28 for operably receiving the driving force causing the leaf spring member 20 to flex outwardly from a normal position, generally in planar configuration, outwardly to a flexed position. As illustrated, each electrical contact 22 is in a closed position when in the normal unflexed position relative to the housing means 18 and is in an open position when flexed outwardly toward the first cover 12 away from the housing means 18. Preferably, the first electrically conductive leaf spring means 14 as illustrated in FIG. 1 is a low current leaf spring means 14 capable of controlling the energization and deenergization of accessories and the like for the vehicle requiring current in the milli-amp range. The lower current leaf spring members 20 can be differentiated with respect to high current leaf spring member 118 by the reduced cross-section required for carrying the lower current.

The housing means 18 includes a first part 16 and a second part 30 which are separable from one another. The first part 16 of the housing means 18 includes a first wall 32 for supporting at least one electrical contact. The number of electrical contacts supported by the first wall 32 generally will correspond to the number of leaf spring members 20 existing for the particular application. By way of illustration, and not limitation, the present invention will be disclosed with reference to a plurality of electrical contacts. At least one electrically conductive member or plate is connected to each electrical contact. Preferably, the electrically conductive member is injection molded as an insert into the first part 16 of the housing means 18. Adjacent each electrical contact, at least one aperture 38 extends through the first wall 32, such that the aperture 38 opens opposite from the pad 28 formed on the outer cantilevered end of the elongated leaf spring member 20 corresponding to the electrical contact and corresponding aperture 38. Plunger means 40 is provided extending through each aperture 38 extending from the pad 28, or in contact with the pad 28, for actuating the flexing movement of the cantilevered end supporting the electrical contact 22 corresponding to the electrical contact supported on the first wall 32 of the first part 16 of the housing means 18.

As illustrated in FIG. 1, the plunger means 40 includes a plurality of separate, individually reciprocal actuator plungers 42 individually engaged within each aperture 38 formed in the first wall 32 of the housing means 18. The first and second parts, 16 and 30 respectively, of the housing means 18 are engagable with one another to form a substantially enclosed chamber therebetween. Extending inwardly within the chamber from the first wall 32 is a pivot support 44. A wave washer 46 is disposed on the pivot support 44 between the first wall 32 and rotatable means 48. The rotatable means 48 is connected to the housing means 18 for at least limited angular rotating movement about a pivot axis extending generally normal to the first wall 32. The rotatable means 48 includes a radially extending first side wall. The radially extending first side wall has at least one concentric cam surface extending arcuately along at least a sector of the rotatable means 48 and opposing the at least one aperture 38 in the first wall 32. Preferably, a plurality of concentric cam surfaces can be provided corresponding in number to the number of apertures 38 and electrical contacts to be individually controlled by the electrical switch 10. Each concentric cam surface can include a ramp portion extending between a lower, or longitudinally inward surface and an upper, or longitudinally outward surface, such that as the rotatable means 48 is rotated between angular positions, the plunger means 40 engages the corresponding inward surface, ramp portion and outward surface. While the plunger means 40 is engaging the pad 28 at one end and is opposite the inward surface at another end, the electrical contacts are closed with respect to one another creating an energized circuit, and after passing the ramp portion, with one end of the plunger means 40 engaging the pad 28 and the other end engaging the outer surface, the electrical connects are spaced from one another in an open position to deenergize an electrical circuit. By appropriately positioning the ramp portions between the inward surface and outward surface, various electrical circuits can be individually controlled independently of one another based on the angular position of the rotatable means 48.

The rotatable means 48 preferably includes a generally cylindrical, disk-like member 60. The disk 60 preferably has a plurality of gear teeth 62 formed along at least a portion of the periphery of the disk 60 for engagement with a corresponding gear member actuated by the key lock/ignition of the motor vehicle (not shown). Of course, other methods of actuating rotation of the disk member 60 can be provided. Along the other portion of the periphery of the disk 60, a generally smooth longitudinally extending surface 64 is provided interrupted by a plurality of detents 66 for defining various angular positions of rotation for the rotatable means 48. The plurality of detents 66 can correspond to an accessory detent, an ignition off or stop detent, a run detent and a start portion or detent. The smooth longitudinally extending surface 64 and detents 66 are engaged by a radially inwardly biased projection 76. The projection 76 is preferably radially inwardly biased by a compression spring 78. The projection 76 and spring 78 can be disposed within a radially outwardly extending aperture 80 formed in the housing means 18. A torsion spring 82 is anchored to the housing means 18 at one end through an aperture formed in the first wall 32, while the opposite end of the torsion spring 82 engages the rotatable means 48 to bias the rotatable means 48 in a desired rotational direction, preferably corresponding to movement of the rotatable means 48 from the start position to the run position when pressure is released from the ignition key of the motor vehicle.

The second part 30 of the housing means 18 is also illustrated in FIG. 1. The second part 30 is similar to the construction of the first part 16 of the housing means 18. The second part 30 preferably includes a second wall 94 for supporting at least one electrical contact 96. Preferably, a plurality of electrical contacts 96 can be provided for individually controlling a plurality of electrical circuits. As illustrated in FIG. 1, the first part 16 is the low current side of the housing means 18, while the second part 30 is the high current side of the housing means 18. At least one electrically conductive member or plate 98 is connected to each electrical contact 96. Preferably, the electrically conductive member 98 is injection molded as an insert into the second part 30 of the housing means 18. At least one aperture 100 is formed through the second wall 94 adjacent to each electrical contact 96 for passage of plunger means 102 through the aperture 100. The plunger means 102 may include elongate, individual actuator plungers 104 disposed within each individual aperture 100 for longitudinal reciprocation therethrough independently of one another.

The rotatable means 48 can include a radially extending second side wall opposing the second wall 94 of the second part 30 of the housing means 18. Preferably, the second side wall can include at least one concentric cam surface. Preferably, a plurality of concentric cam surfaces are provided corresponding to the number of apertures in the second wall 94 of the second part 30. Each cam surface includes a ramp portion extending between a lower or longitudinally inward surface and an upper, or longitudinally outward surface, such that the plunger means 102 slidably engages the second side wall of the rotatable means 48 and reciprocates in longitudinal direction in response to rotation of the rotatable means 48 as it engages the inward surface, ramp portion and outward surface. The opposite end of each elongate, actuator plunger 104 engages a cantilevered free end of a second electrically conductive leaf spring means 116. The plunger means 102 is similar to the plunger means 40 and is engageable through the aperture 100 in the second wall 94 for slidably engaging the cam surface with a first end and for moving a second end corresponding to a contour of the cam surface as the cam surface moves with respect to the first end of the plunger means 102 when the rotatable means 48 is rotated between different angular positions.

Preferably, the second electrically conductive leaf spring means 116 includes at least one electrically conductive leaf spring member 118. By way of illustration, and not limitation, the present invention is disclosed with respect to three individual, independently operable leaf spring members 118 for operably energizing and deenergizing high current electrical circuits capable of handling 35 amps of continuous current with peaks up to approximately 50 amps. Preferably, each leaf spring member 118 is formed of an electrically conductive material having resilient flexibility for urging or biasing the plunger means 102 toward it's respective cam surface. It has been found that a suitable electrically conductive metallic material for the leaf spring members 118 is beryllium copper (BeCu). Preferably, each leaf spring member 118 is insert molded with a common support 120 for fixedly securing one end of each leaf spring member 118 while leaving the opposite end of each leaf spring member 118 cantilevered for free flexing movement outwardly toward a second cover 122. Preferably, each outer cantilevered end of the leaf spring member 118 is insert molded with an injection molded plastic pad 124 for engaging the opposite end of it's respective plunger means 102. The common support 120 preferably includes apertures 126 aligned with apertures 26 through the common support 24 of the first leaf spring means 14 while passing through the first and second parts of the housing means 18 for assembling the electrical switch 10 in a final assembly with fasteners (not shown).

Locking means 86 is provided for releasably securing a first member, such as housing means 18, with respect to a second member, such as an ignition switch steering column casting or housing 130. The locking means 86 preferably includes reciprocal locking members 88 disposed on opposite sides of the housing means 18 within respective slots or first apertures 90 formed in the longitudinally extending side wall thereof. The locking members 88 are spring biased in a locking direction by compression springs 92. The reciprocal locking members 88 are engagable within slots or second apertures 132 formed within the ignition switch casting 130 for the motor vehicle. Further details of the electrical switch according to present invention can be obtained from the pending U.S. Pat. No. 5,596,180 issued Jan. 21, 1997 entitled Ignition Switch With Electrically Conductive Leaf Spring Members, which is incorporated by reference herein in it's entirety.

Referring now to FIGS. 2–6, the steering column housing or ignition switch casting 130 slidably receives the switch housing means 18 therein. The switch housing means 18 supports the electrical switch and has at least one first aperture 90 formed therein. Locking means 86 is engagable within the first aperture 90 and is movable between a first position retracted within the first aperture 90, and a second position extending outwardly with respect to the first aperture 90. The locking means 86 engages within the second aperture 132 when the switch housing means 18 is slidably engaged and fully seated within the steering column housing 130. The locking means 86 holds the switch housing means 18 with respect to the steering column housing 130 when in the fully seated position. Biasing means 134 is provided for urging the locking means 86 toward the second position. The biasing means 134 can include a compression spring 92. Preferably, guide means 136 is provided for guiding the switch housing means 18 with respect to the steering column housing 130 during insertion therein. The guide means 136 can include the switch housing means 18 having at least one guide rail 138 disposed thereon. Preferably, the first aperture 90 is formed in the at least one guide rail 138. The guide means 136 can also include the steering column housing 130 having at least one complementary guide slot 140 formed therein for receiving the guide rail 138 during insertion of the switch housing means 18 within the steering column housing 130. Preferably, the second aperture 132 is formed in a side wall defining the at least one guide slot 140 in the steering column housing 130.

Referring now to FIGS. 3–6, the locking means 86 preferably includes at least one reciprocal locking member 88 disposed within a first aperture 90 formed in the switch housing means 18. Each reciprocal locking member 88 includes an aperture 142 formed therein for receiving a portion of the biasing means 134. The aperture 142 may also include a closed end 144 defining a seat for one end of the compression spring 92. In the preferred form, the reciprocal locking member 88 includes a first ramp surface 146 formed on an upper portion thereof extendible outwardly from the first aperture 90 of the switch housing means 18. The first ramp surface 146 is disposed on the reciprocal locking member 88 for sliding engagement with the steering column housing 130. Preferably, the first ramp surface 146 is disposed at an angle 148 with respect to a side wall 150 of the reciprocal locking member 88. The angle 148 is preferably between 30° and 45° inclusive. The reciprocal locking member 88 can also include a second ramp surface 152 disposed at a second angle 154 with respect to a second side wall 156 of the reciprocal locking member 88. Preferably, the second angle 154 is between 45° and 60° inclusive.

Figure 5:
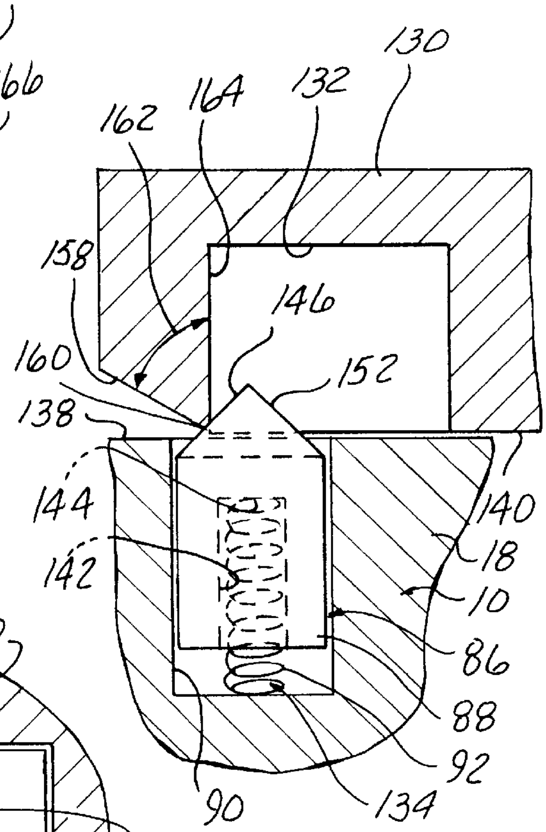
FIG. 5 is a detail cross sectional, side view of the plunger means according to the present invention engagable within a second aperture of the steering column housing.

As best seen in FIG. 5, the steering column housing 130 can include an inclined surface 158 formed thereon. The inclined surface 158 may have at least one edge 160 engagable with the first ramp surface 146 of the locking means 86. The one edge 160 of the inclined surface 158 is engagable with the first ramp surface 146 to hold the switch housing means 18 with respect to the steering column housing 130 when the switch housing means 18 is fully seated with respect to the steering column housing 130. The inclined surface 158 preferably is disposed at an angle 162 with respect to a side wall 164 defining the second aperture 132 of the steering column housing 130. The angle 162 is preferably between 45° and 60° inclusive. The second ramp surface 152 of the locking means 86 can define a leading surface during insertion of the switch housing mean 18 into the steering column housing 130. In this configuration, the first ramp surface 146 of the locking means 86 defines a trailing surface during insertion of the switch housing mean 18 into the steering column 130. The one edge 160 of the inclined surface 158 of the steering column housing 130 is engageable with the second ramp surface 152 during insertion of the switch housing means 18 slidably within the steering column housing 130, until the switch housing means 18 is fully seated within the steering column housing 130, such that the one edge 160 is engaged with the first ramp surface 146 to hold the switch housing means 18 in an aligned position with respect to the steering column housing 130. As depicted in FIG. 5, the switch housing means 18 is engaged in a fully seated position with respect to the steering column housing 130, so that the reciprocal locking member retains and aligns the switch housing means 18 with respect to the steering column housing 130 by engagement with edge 160.

Figure 3:
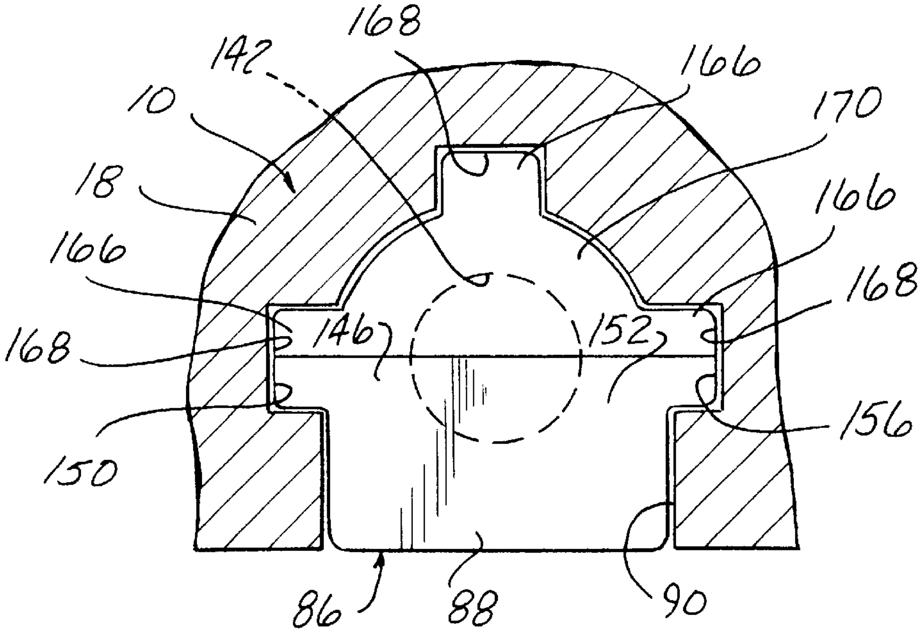
FIG. 3 is a detailed, plan view of plunger means for retaining and aligning a switch housing of a motor vehicle with respect to a steering column housing according to present invention.
Figure 4:
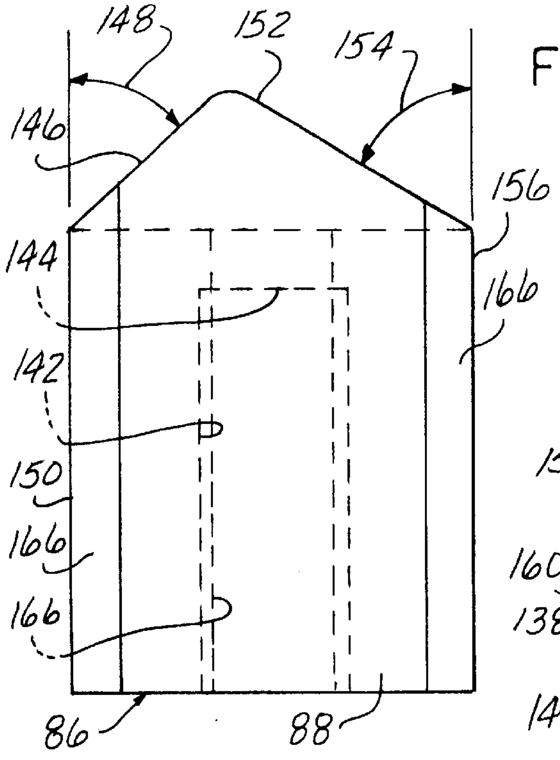
FIG. 4 is a side elevational view of the plunger means according to the present invention.
Figure 6:
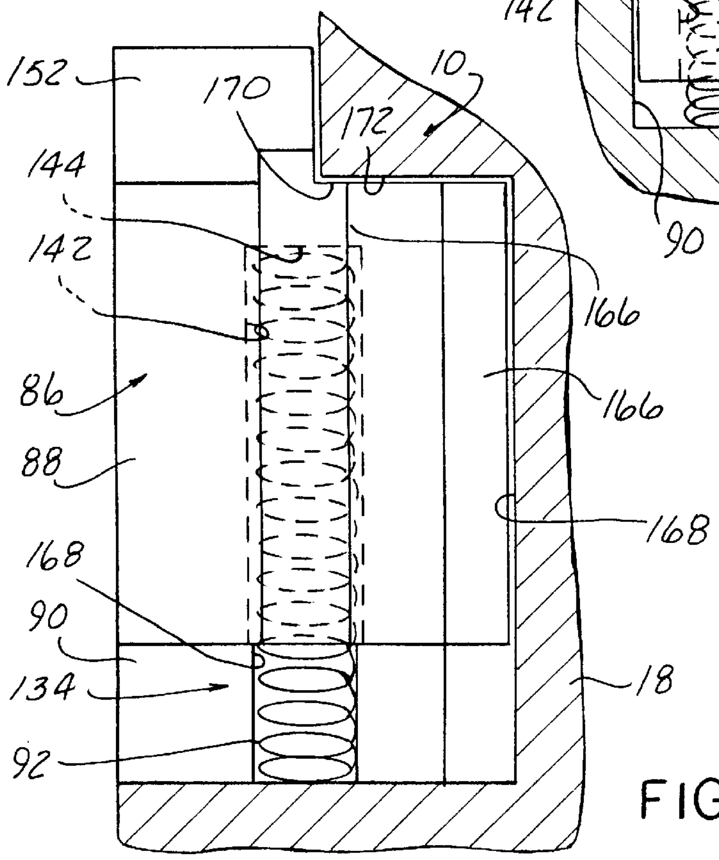
FIG. 6 is a cross sectional, detail view of the plunger means reciprocally received within a first aperture of the switch housing according the present invention.

Referring now to FIGS. 3, 4 and 6, the locking means 86 can include at least one, and preferably a plurality of ribs 166 extending outwardly along a longitudinal length of the reciprocal locking member 88. A corresponding number of complementary grooves 168 can be formed in the side walls defining the first aperture 90 in the switch housing means 18. The ribs 166 and complementary grooves 168 act in cooperation with one another to guide the reciprocal locking member 88 as it moves between the first and second positions. The locking means 86 is held within the first aperture 90 by the cooperating action between an end surface 170 formed on the reciprocal locking member 88 and a stop surface 172 formed as part of the housing 18 as best seen in FIG. 6.

It has been determined through the performance of torque versus displacement and force testing that the required force to install the switch housing means 18 within the steering column housing 130 generally falls in the range of between approximately 7 Newtons and 10 Newtons inclusive. It has also been found through the performance of appropriate testing that the force needed to pull out the ignition switch housing means 18 from the fully seated position within the lock cylinder housing casting 130 is a maximum load generally in the range of approximately 300 Newtons to approximately 500 Newtons. An inspection after the tests found that the plastic holding tabs or locking members 88 on the ignition switch housing means 18 yielded at the maximum load. The test results listed above are given for purposes of illustration and by way of example, not by way of limitation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus comprising:

a first member having at least one first aperture with a noncircular shaped periphery;

a second member having at least one second aperture, said second member having an inclined surface thereon, said inclined surface having at least one edge;

at least one reciprocal locking member having a complementary shaped periphery engageable within each first aperture preventing rotation of said locking member with respect to said first aperture while maintaining a predetermined orientation during reciprocal movement between a first position retracted within said first aperture and a second position extending outwardly with respect to said first aperture, said locking member for engaging within said second aperture when said first member is slidably engaged and fully seated within said second member and for holding said first member with respect to said second member in said fully seated position, said at least one edge engageable with said locking member for operably locking said first member against dislodging movement; and biasing means for urging said locking member toward said second position.

2. The apparatus of claim 1 further comprising:

said at least one edge of said inclined surface engageable with said locking member to hold said first member with respect to said second member when said first member is fully seated with respect to said second member.

3. The apparatus of claim 1 further comprising:

said locking member having a first ramp surface. and a second ramp surface formed thereon, the second ramp surface defining a leading surface during insertion of said first member into said second member, and said first ramp surface defining a trailing surface of said locking member during insertion of said first member into said second member; and said at least one edge of said inclined surface engageable with said second ramp surface during insertion of said first member slidably within said second member and engageable with said first ramp surface when said first member is full seated within said second member to hold said first member with respect to said second member for reciprocating said locking member toward said retracted position against said urging of said biasing means.

4. The apparatus of claim 1 further comprising:

said inclined surface disposed at an angle with respect to a side wall defining said second aperture for receiving said locking member, wherein said angle is between 45° and 60° inclusive.

5. An apparatus comprising:

a first member having at least one first aperture with a noncircular shaped periphery;

a second member having at least one second aperture;

at least one reciprocal locking member having a complementary shaped periphery engageable within each first aperture preventing rotation of said locking member with respect to said first aperture while maintaining a predetermined orientation during reciprocal movement between a first position retracted within said first aperture and a second position extending outwardly with respect to said first aperture, said locking member for engaging within said second aperture when said first member is slidably engaged and fully seated within said second member and for holding said first member with respect to said second member in said fully seated position;

biasing means for urging said locking member toward said second position; and guide means for guiding said first member with respect to said second member during insertion therein, wherein said guide means further includes said first member having at least one guide rail disposed thereon, and said second member having at least one complementary guide slot formed therein for receiving said guide rail during insertion therein, said second aperture formed in a side wall defining said at least one guide slot.

* * * * *